US008463174B2

(12) United States Patent
Couch et al.

(10) Patent No.: US 8,463,174 B2
(45) Date of Patent: Jun. 11, 2013

(54) SYSTEM AND METHODS FOR SEQUENCING LEARNING OBJECTS BASED UPON QUERY AND USER RELEVANCY

(75) Inventors: Jacob Couch, Oklahoma City, OK (US); Curtis Stratman, Pittsburgh, PA (US); Jeremy Espenshade, Lancaster, PA (US); Scott Reynolds, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 1157 days.

(21) Appl. No.: 12/025,455

(22) Filed: Feb. 4, 2008

(65) Prior Publication Data

US 2009/0197237 A1 Aug. 6, 2009

(51) Int. Cl.
*G09B 3/00* (2006.01)
*G09B 7/00* (2006.01)

(52) U.S. Cl.
USPC ............ 434/350; 434/322; 434/323; 434/362

(58) Field of Classification Search
USPC ........................... 434/219, 322, 323, 350, 362
See application file for complete search history.

(56) References Cited

U.S. PATENT DOCUMENTS

| 7,052,277 | B2* | 5/2006 | Kellman ...................... 434/118 |
| 7,231,381 | B2* | 6/2007 | Li et al. ......................... 707/766 |
| 2002/0142274 | A1* | 10/2002 | Fujino ........................... 434/219 |
| 2003/0232315 | A1* | 12/2003 | Pfund ........................... 434/350 |
| 2004/0023197 | A1* | 2/2004 | Abraham-Fuchs et al. .. 434/236 |

\* cited by examiner

*Primary Examiner* — Xuan Thai
*Assistant Examiner* — Jerry-Daryl Fletcher
(74) *Attorney, Agent, or Firm* — Novak Druce Connolly Bove + Quigg LLP

(57) ABSTRACT

A system for generating a sequence of learning objects comprising an e-Learning course is provided. The system can include one or more processors and a memory unit for electronically storing data comprising a plurality of learning objects. The system further can include a sequence builder configured to execute on the at least one processor. The sequence builder, more particularly, can be configured to generate a sequence comprising at least a portion of the plurality of learning objects based upon a measurable user relevancy and/or a measurable query relevancy of each learning object contained in the sequence.

10 Claims, 4 Drawing Sheets

SYSTEM AND METHODS FOR SEQUENCING LEARNING OBJECTS BASED UPON QUERY AND USER RELEVANCY

FIELD OF THE INVENTION

The present invention is related to the field of data processing and communications systems, and more particularly, to data processing and communications systems for enhancing users educational and learning experiences.

BACKGROUND OF THE INVENTION

Various computer-based systems have been developed under the rubric of electronic learning, or e-Learning. Thus, in general, e-Learning denotes various computer-based technologies and methodologies directed to education and learning, particularly those utilizing multimedia and networking technologies.

One aspect of e-Learning is the construction of courses of instruction using computing devices and systems. Such construction typically requires the identification and sequencing of relevant learning objects. The learning objects generally must be sequenced so as to satisfy certain established educational or pedagogical constraints. These constraints can comprise both required learning objectives and the prerequisites of the learning objectives.

Conventional e-Learning courses are built as a static sequencing of learning objects. Often, however, there are many possible sequences of the learning objects that would satisfy all predetermined constraints. Most, however, are not optimal, at least for all users. Different users have different needs pertaining to the depth, style, and quantity of learning content and materials presented.

There is as yet no effective and efficient mechanism or method for dynamically adapting available content to the needs of an individual user. Likewise, there is as yet no effective mechanism or method for determining an optimal sequence of learning objects with respect to an individual user.

SUMMARY OF THE INVENTION

The present invention is directed to systems, computer products, and methods for constructing e-Learning courses. One aspect of the invention is the constructing of an e-Learning course that, in addition to meeting predetermined learning objectives, is adapted to the needs of a particular e-Learning course user. Accordingly, another aspect of the invention is the personalization of an e-Learning course that are constructed by searching relevant learning objects, ranking the relevancy of the learning objects to a particular e-Learning course user, and logically sequencing the relevant learning objects into a complete e-Learning course.

One embodiment of the invention is a system for generating a sequence of learning objects comprising an e-Learning course. The system can include one or more processors. Additionally, the system can include a memory unit for electronically storing data comprising a plurality of learning objects. The system further can include a sequence builder configured to execute on the at least one processor. The sequence builder, more particularly, can be configured to generate a sequence that includes at least a portion of the plurality of learning objects, the learning objects being selected for the sequence based upon a measurable user relevancy and/or a measurable query relevancy of each learning object contained in the sequence.

Another embodiment of the invention is a computer-implemented method for generating a sequence of learning objects comprising an e-Learning course. The method can include iteratively selecting a learning object from a plurality of learning objects to determine whether one or more predetermined prerequisites of the selected learning object are satisfied. According to the method, if the one or more predetermined prerequisites are satisfied, then the selected learning object can be added to a sequence of learning objects. The method also can include repeating the selecting and adding steps until each of one or more learning objectives is satisfied by the sequence of learning objects. Additionally, the method can include ranking the sequence of learning objects based upon a computed measure of user relevancy and a computed measure of query relevancy of the sequence of learning objects. The method can further include generating a new sequence of learning objects and ranking the new sequence of learning objects based upon a computed measure of user relevancy and a computed measure of query relevancy of the new sequence of learning objects. The method can include returning the new sequence of learning objects if the rank of the new sequence exceeds the rank of the sequence of learning objects, and otherwise returning the sequence of learning objects.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
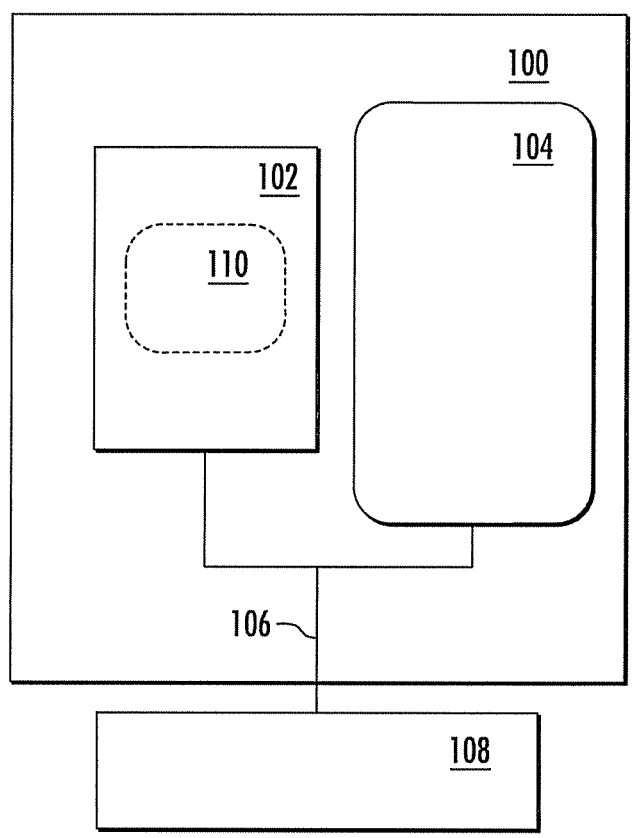
FIG. 1 is a schematic view of a system for generating a sequence of learning objects, according to one embodiment of the invention, is utilized.

FIG. 1 is a schematic view of a system 100 for generating a sequence of learning objects, according to one embodiment of the invention. The sequence of learning objects so generated can comprise an e-Learning course.

Illustratively, the system 100 includes one or more processors 102 for processing electronic data. The one or more processors 102 can comprise registers, logic gates, and other logic-based circuitry (not explicitly shown). The system 100 further illustratively includes a memory unit 104 communicatively linked to the one or more processors 102 through one or more buses 106, the memory unit being capable of electronically storing data comprising a plurality of learning objects as well as processor-executable instructions for directing the one or processors to perform one or more processing operations on the stored data. Optionally, the system 100 can further include one or more input/output devices 108 communicatively linked to the one or more processors 102 and the memory unit 104 through the bus 106 for receiving data input from a user and for returning the results of processing operations performed by the one or more processors.

The system 100 also illustratively includes a sequence builder 110 configured to execute on the one or more processors 102. When executing on the one or more processors 102, the sequence builder 110 causes the one or more processors to perform the procedures described herein. Accordingly, the sequence builder 110 can be implemented in machine-readable code. Alternately, however, the sequence builder 110 can be implemented in dedicated hardwired circuitry configured to perform the procedures described herein. In still another embodiment, the sequence builder can be implemented in a combination of hardwired circuitry and machine-readable code.

Operatively, the sequence builder 110 causes the system 100 to generate a sequence of learning objects. Each learning object comprises certain data content that is presented to a user to instruct or inform the user of a particular concept. In the aggregate, a plurality of concepts comprises a complete course for learning.

One aspect of the sequence builder 110 is that it can direct the system 100 to find a "best path" or optimal sequence for presenting the learning objects to the user. Specifically, the sequence can comprise learning objects that fulfill a predetermined set of learning objectives. Moreover, the sequence can comprise learning objects that are selected on the basis of their relevancy to a user-supplied query and their relevancy to the individual needs or interests of the user; that is, the sequence builder 110 is able to generate a personalized presentment of concepts in the form of learning objects tailored for an individual user.

Figure 2:
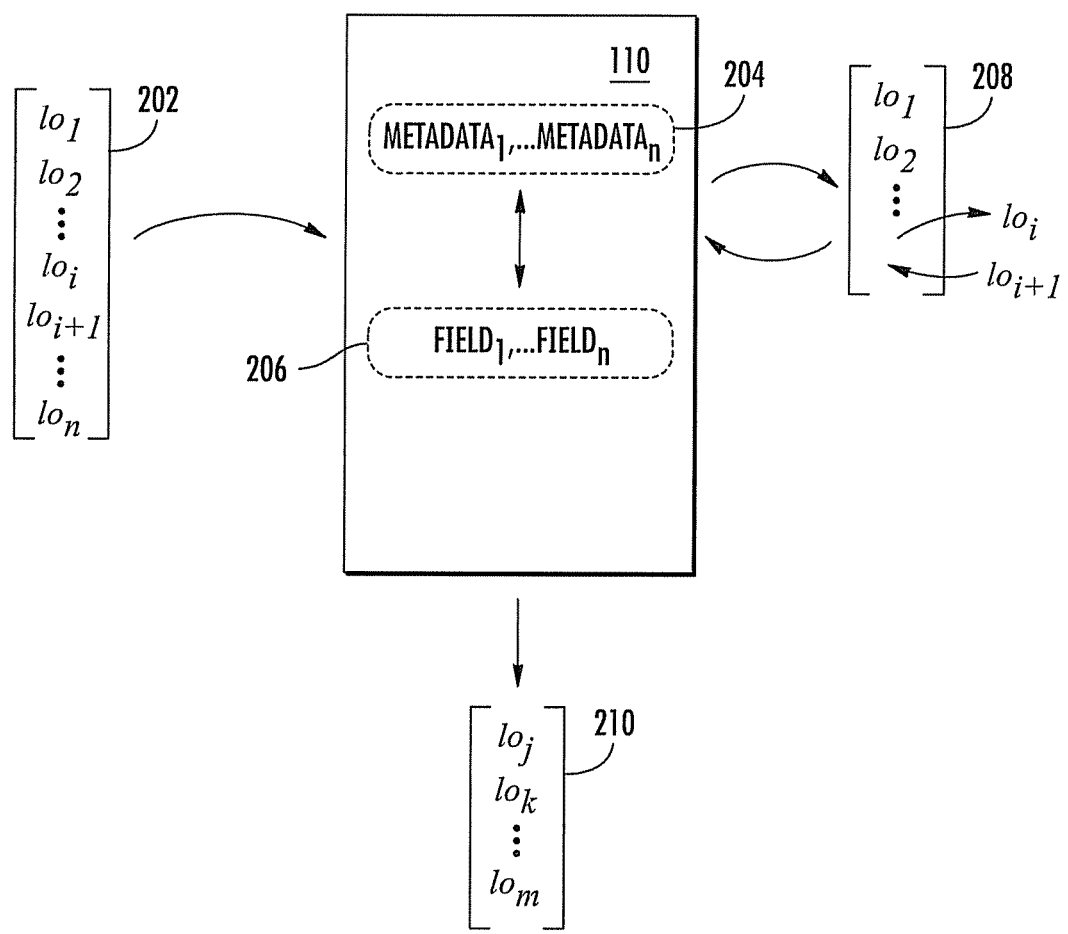
FIG. 2 is a schematic view of certain operative features of the system in FIG. 1.

Referring additionally to FIG. 2, certain operative aspects 200 of the system 100 are schematically illustrated. The sequence builder 110 can receive a vector 202 of learning objects, $lo_1, lo_2, \ldots, lo_i, lo_{i+1}, \ldots, lo_n$. The learning objects of the vector 202, according to one embodiment, can be ranked by comparing learning object metadata 204 with user-specific data, which can be stored in a user profile 206. The metadata 204 corresponding to a learning object can comprise semantic information. The semantic information can specify the prerequisite concepts that a user should have been exposed to prior to the learning object being presented to the user. The semantic information also can specify the learning objectives that the learning object is intended to satisfy. The user-specific data stored in a user profile 206 can similarly include semantic information that specifies learning attributes and/or objectives of the user. The comparison can be made by comparing the metadata of the learning object with data in corresponding fields of the user profile 206. Based on the comparison, the learning objects of the vector 202 can be ranked according to how closely a learning object matches the user profile 206.

The sequence builder 110 selects the first learning object, $lo_1$, which is the highest ranked learning object, and determines whether the user meets the prerequisites specified for that learning object. If so, then the learning object is placed in the sequence of learning objects. Next, the second learning object is selected, $lo_2$, and the sequence builder 110 repeats the process. The sequence builder 110 continues the process until all of a predetermined set of learning objectives are satisfied by the learning objects included in the sequence 208.

The sequence builder 110 ranks the completed sequence 208 based upon a computed measure of user relevancy and/or a computed measure of query relevancy of the sequence of learning objects. As already noted, metadata for each learning object can be compared to corresponding fields of the user profile 206, both the metadata and user profile 206 comprising semantic information. Accordingly, in one embodiment, the semantic information can comprise quantitative values, such as ordinal rankings (e.g., 1, 2, . . . ) or percentage values (0% to 100%) that measures the strengths of various attributes of a learning object and corresponding user and/or query relevance of the same attributes. Thus, according to this embodiment, each completed sequence can be given a ranking score measured by a sum of the difference between these values such that a lower value indicates less deviation between the attributes of the learning objects of the sequence 208 and the relative importance, or relevancy, to the user and/or a specific user-supplied query. Any ranking or scoring technique can be utilized provided that it consistently measures the closeness, or conversely the deviation, between the attributes of each learning object and corresponding user-and/or query-specified attributes particular the individual user.

Once the sequence 208 has been completed, the sequence builder 110 can replace, remove, or add learning objects to generate one or more different sequences of learning objects. A different sequence can include one or more learning objects not yet tested for relevancy. Also, the sequence builder 110 can generate a different sequence by reordering the sequence in which an equivalent group of learning objects is presented. The sequence builder 110 thus can construct and rank different combinations as well as different permutations of learning objects. For example, if one permutation includes the first, second, third, and fourth learning objects, an alternative permutation can be the first, second, and fourth learning objects. Accordingly, the sequence builder 110 can determine whether in this latter sequence, which comprises one less learning object, the fourth learning object when included in the sequence without the third nonetheless satisfies the learning objectives corresponding to the third and fourth learning objects.

When replacing learning objects in the sequence, if the learning objects have been ranked as described, then the sequence builder 110 can replace the last-added learning object, $lo_i$, with the next best (in terms of user and/or query relevancy) object, $lo_{i+1}$, as shown in FIG. 2. The sequence builder 110 thus creates a new sequence of learning objects and, as described, can rank the new sequence of learning objects. If the new sequence has a higher rank, or equivalently a smaller measure of deviation, than the previous sequence 208, then the new sequence of learning objects can replace the previous sequence. Repeating the process for different combinations of learning objects yields the sequence of learning objects 210 having a score or ranking that best satisfies all specified learning objectives with the smallest number of learning objects. This sequence of learning objects 210 can then be presented to the user. The sequence of learning objects 210 can comprise a course of learning, such as an e-Learning course.

In order to generate a sequence of learning objects with optimized granularity, not all prerequisites need be satisfied. Thus, according to another embodiment, the sequence builder 110 can be configured to determine which of the predetermined prerequisites can be effectively ignored. The score for a learning object based on user and/or query relevancy can be compared to a threshold value, selected so as to exclude unnecessary learning objects. Specifically, if a score for a learning object exceeds the threshold, the learning objective requirement satisfied by the learning object is marked as fulfilled, and the learning object is added by the sequence builder to the sequence of learning objects being constructed. Accordingly, the process prevents unrelated, or overly general, content from being presented in the sequence, which can be especially important to an expert user who need not be presented very general learning objects.

According to a particular embodiment, the sequence builder 110 can be configured to compute the ranking score for completed sequences by talking an average of user and query relevance scores for the learning objects included within a sequence. Additionally, a penalty can be added for each learning object added to the sequence, such that the sequence generated by the sequence builder 110 does not become excessive; that is, factoring in a penalty helps ensure that not too many learning objects are included beyond the number needed to satisfy the predetermined learning objectives. Moreover, the sequence builder 110 can be configured to compute the ranking score based upon the summation contemporaneously as each decision is made by the sequence builder to add a learning object to a sequence being generated. If at any time the score exceeds (i.e., indicates greater deviation of the sequence) that of a previously generated sequence, then the sequence builder 110 process ceases and either re-initiates the process with another untested learning object or returns the previously-generated sequence having the better score.

Figure 3A:
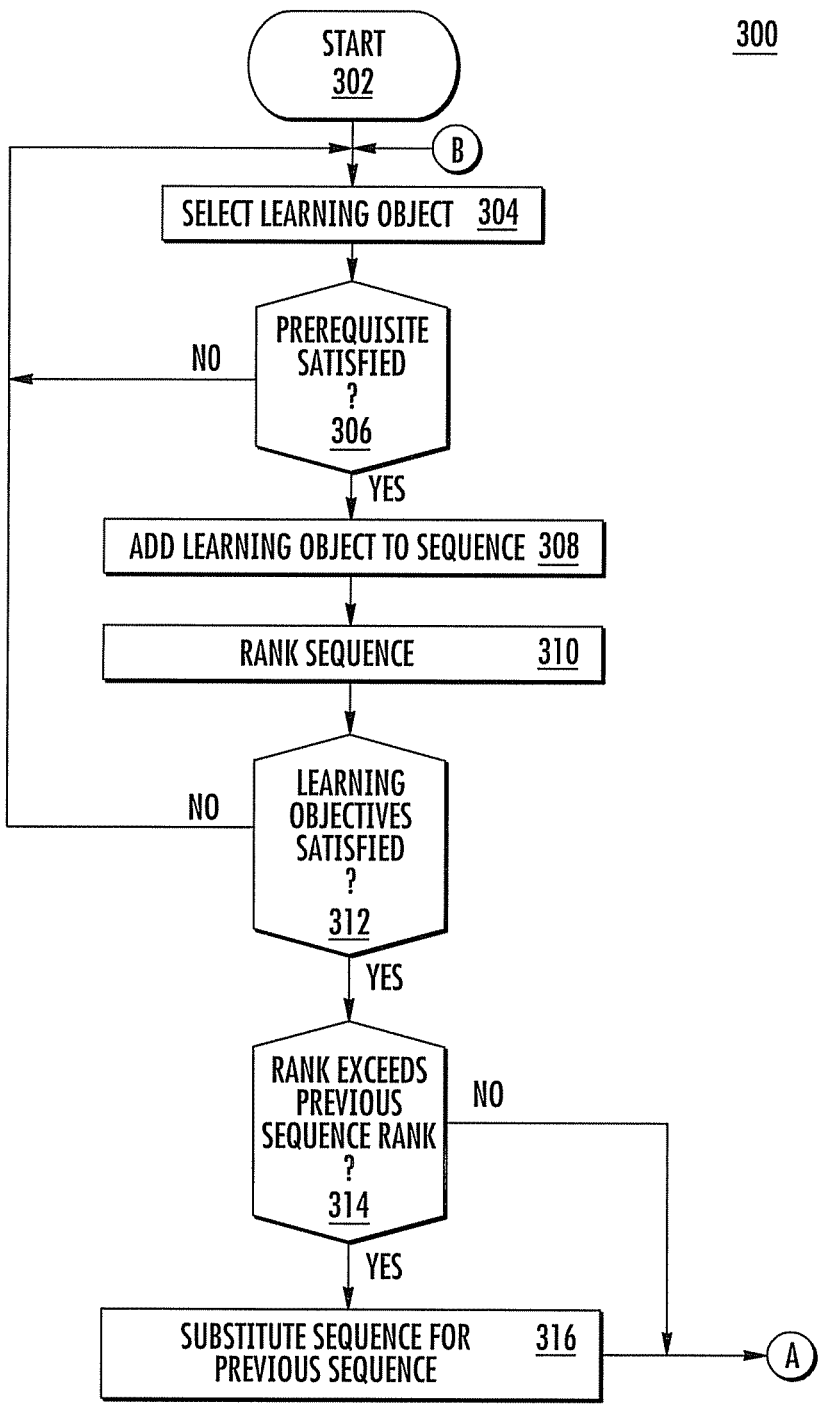
FIGS. 3A and 3B are flowcharts of exemplary steps in a method for generating a sequence of learning objects, according another embodiment of the invention.
Figure 3B:
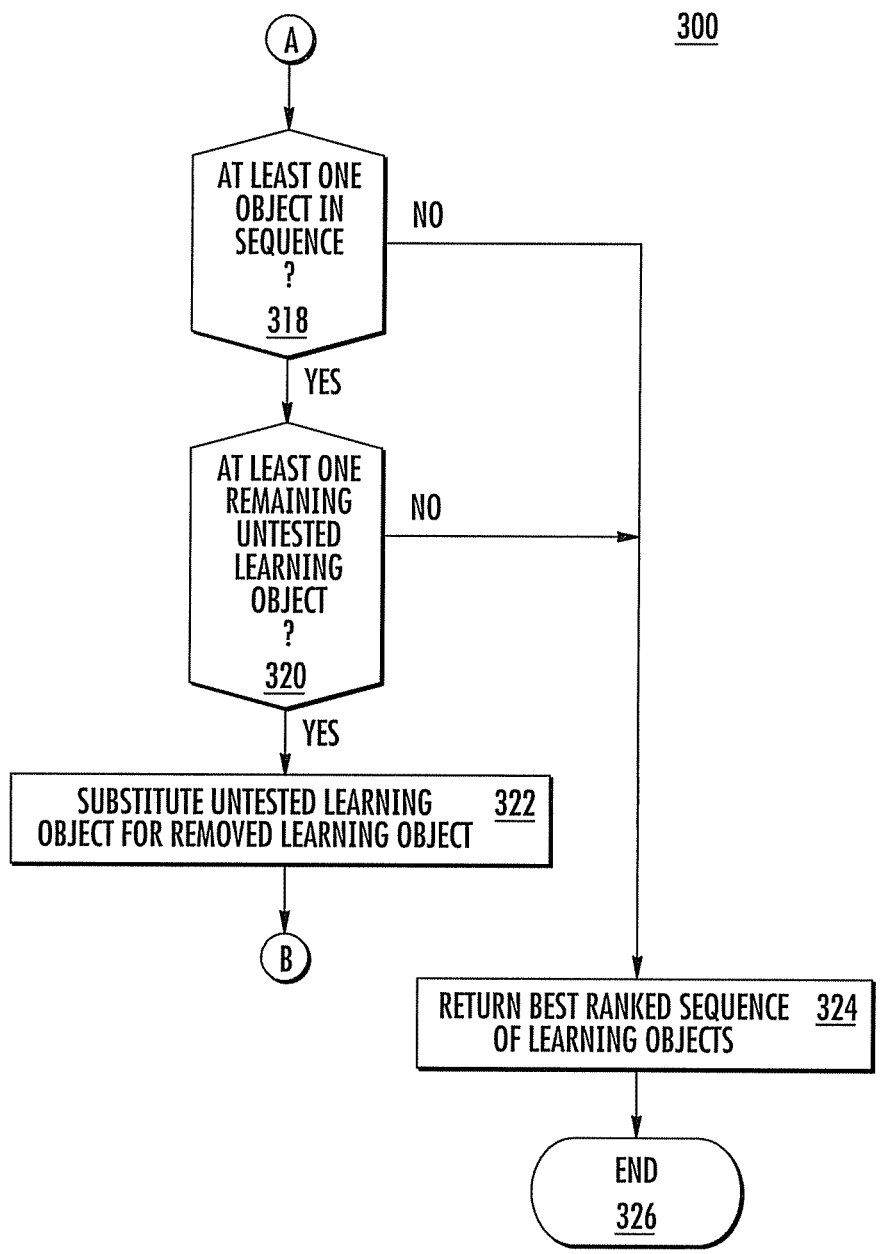

FIG. 3 is a flowchart of exemplary steps in a method 300 for generating a sequence of learning objects, according another embodiment of the invention. The method 300, after the start at 302, includes iteratively selecting a learning object from a plurality of learning objects to determine whether one or more predetermined prerequisites of the selected learning object are satisfied at step 304. At step 306 it is determined whether one or more predetermined prerequisites are satisfied. If so, the selected learning object is added to a sequence of learning objects at step 308. At step 310, it is determined whether the current sequence exceeds a current best sequence. If this is true, then no additional processing is done on this sequence and other permutations of sequences are tried. At step 312, it is determined whether one or more predetermined learning objectives are satisfied by the sequence. The method 300 continues by returning to step 304 and repeating the selecting and adding steps until each of one or more learning objectives is satisfied by the sequence of learning objects.

The sequence is ranked at step 312. The ranking of the sequence of learning objects is based upon a computed measure of user relevancy and a computed measure of query relevancy of the sequence of learning objects. If at step 314 it is determined that the rank of the sequence exceeds that of a previously-generated sequence, then the sequence is substituted for the previously-generated one at step 316. At step 318 it is determined whether the sequence of learning objects includes one or more learning objects, and at step 320 is determined whether at least one learning object remains untested. If both conditions are met, then the process continues at step 322 by removing at least one learning object from the sequence and adding the at least one untested learning object, after which the method returns to step 304 and the selecting and adding steps to generate a new sequence of learning objects that satisfies each of the one or more learning objectives are repeated. However, if the conditions at step 318 and 320 are not both met, then the method 300 returns the best ranked sequence of learning objects at step 324. The method 300 illustratively ends at step 326.

According to one embodiment of the method 300, computing measures of user relevancy and query relevancy for the sequence of learning objects and for the new sequence of learning objects can comprise determining for each learning object added to a sequence a measure of quantitative deviation between a value of the learning objective added and at least one of a user relevancy value and a query relevancy value. The step of ranking the sequence of learning objects and the new sequence of learning objects can comprise computing a ranking score based upon a summation of measures of quantitative deviation for the sequence of learning objects and for the new sequence of learning objects.

Such a sequence having a lower ranking score can be ranked higher than a sequence having a higher ranking score. Summing the measures of quantitative deviation for the new sequence of learning objects can be performed contemporaneously with addition of each new learning object to the new sequence of learning objects. Accordingly, if during the repeating of the selecting and adding steps to generate a new sequence of learning objects the ranking score based upon the summation of measures of quantitative deviation, the computed ranking score exceeds the ranking score of the sequence of learning objects, then the repeating of the selecting and adding steps to generate a new sequence of learning objects can be suspended. If the selecting and adding steps to generate a new sequence of learning objects ceases, and if at least one learning object remains untested, then the method 300 can subsequently continue by removing at least one learning object from the sequence of learning objects and adding the at least one untested learning object. The selecting and adding steps can then be repeated to generate another new sequence of learning objects that satisfies each of the one or more learning objectives.

According to another embodiment of the invention, prior to adding a learning object to the sequence of learning objects, a predetermined value of the learning object can be compared to a user-relevancy threshold. If the predetermined value exceeds the user-relevancy threshold, then a prerequisite objective corresponding to the learning object can be marked as fulfilled and the learning object can be added to the sequence of learning objects.

According to still another embodiment, ranking the sequence of learning objects based upon the computed measures of user relevancy and query relevancy of the sequence of learning objects can comprise assigning a user relevancy score and a query relevancy score to each learning object added to the sequence of learning objects. The method 300 can further include computing an average of these user relevancy and query relevancy scores. Moreover, a penalty value can be added, or factored in to the computation, for each learning object added to the sequence of learning objects. More particularly, each penalty value can be directly proportional to the assigned user relevancy and query relevancy scores of the learning object for which the penalty is added.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein. The computer program can comprise computer-readable code embedded in a computer-readable storage medium, such as a compact disk.

The invention, as also already noted, can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A computer-implemented method for generating a finite sequence of learning objects, the method comprising:
   selecting a learning object that meets at least one of a plurality of predetermined learning objectives from a plurality of learning objects to yield a selected learning object;
   comparing an object score for the selected learning object to threshold criteria for user relevancy and query relevancy to determine whether each of one or more predetermined learning prerequisites corresponding to the learning object is satisfied, the object score based upon computed measures of user relevancy and query relevancy for the selected learning object;
   if each predetermined learning prerequisite is satisfied, adding the selected learning object to a first sequence of learning objects;
   repeating said selecting, comparing, and adding until each of the plurality of predetermined learning objectives are satisfied by the first sequence;
   computing a first score for the first sequence based upon computer measures of at least one among user relevancy and query relevancy of each learning object in the first sequence;
   generating a second finite sequence of learning objects by removing at least one learning object from the first sequence and adding at least one untested learning object from the plurality of learning objects when the first sequence includes one or more learning objects and at least one of the plurality of learning objects remains untested;
   computing a second score for the second sequence based upon computed measures of at least one among user relevancy and query relevancy of each learning object in the second sequence, wherein the first sequence and the second sequence are different in at least included learning objects ; and
   providing the second sequence to a user if the second score of the second sequence exceeds the first score of the first sequence, and otherwise presenting the first sequence to the user.

2. The method of claim 1, further comprising determining at least one among user relevancy and query relevancy of a learning object by computing a measure of deviation between a quantitative value of a learning objective of the learning object and at least one among a user relevancy value and a query relevancy value of the learning object.

3. The method of claim 2, wherein computing the first score and second score comprises computing measures of deviation for each learning object in a corresponding sequence of learning objects and summing the measures of deviation for each of the first and second sequence.

4. The method of claim 3, wherein summing the measures of deviation occurs contemporaneously with adding a learning object to the corresponding sequence of learning objects.

5. The method of claim 4, wherein generating a second finite sequence of learning objects comprises:
   selecting a learning object that meets at least one of the plurality of predetermined learning objectives from the plurality of learning objects to yield a selected learning object;
   comparing an object score for the selected learning object to the threshold criteria for user relevancy and query relevancy to determine whether each of one or more predetermined learning prerequisites corresponding to the learning object is satisfied, the object score based upon computed measures of user relevancy and query relevancy for the selected learning object;
   if each predetermined learning prerequisite is satisfied, adding the selected learning object to the second sequence;
   repeating said selecting, comparing, and adding until the sum of measures of deviation of the second sequence exceeds the summation of measures of deviation of the first sequence, or otherwise until each of the plurality of predetermined learning objectives are satisfied by the second sequence.

6. The method of claim 5, further comprising, if said selecting and adding cease before generation of the second sequence is completed and if at least one learning object among the plurality of learning objects remains untested, generating a third finite sequence of learning objects by removing at least one learning object from the first sequence of learning objects and adding the at least one untested learning object to thereby generate the third sequence.

7. The method of claim 1, wherein ranking the sequence of learning objects based upon the computed measures of user relevancy and query relevancy of the sequence of learning objects comprises assigning a user relevancy score and a query relevancy score to each learning object added to the sequence of learning objects and computing an average of the user relevancy and query relevancy scores.

8. The method of claim 7, further comprising adding a penalty value for each learning object added to the sequence of learning objects, each penalty value being directly proportional to the assigned user relevancy and query relevancy scores of the learning object for which the penalty is added.

9. A system for generating a finite sequence of learning objects, the system comprising:
   at least one processor; a memory unit for electronically storing data comprising a plurality of learning objects; and a sequence builder configured to execute on the at least one processor for:
      selecting a learning object that meets at least one of a plurality of predetermined learning objectives from a plurality of learning objects to yield a selected learning object;
      comparing an object score for the selected learning object to threshold criteria for user relevancy and query relevancy to determine whether each of one or more predetermined learning prerequisites corresponding to the learning object is satisfied, the object score based upon computed measures of user relevancy and query relevancy for the selected learning object;
      if each predetermined learning prerequisite is satisfied, adding the selected learning object to a first sequence of learning objects;
      repeating said selecting, comparing, and adding until each of the plurality of predetermined learning objectives are satisfied by the first sequence;

computing a first score for the first sequence based upon computer measures of at least one among user relevancy and query relevancy of each learning object in the first sequence;

generating a second finite sequence of learning objects by removing at least one learning object from the first sequence and adding at least one untested learning object from the plurality of learning objects when the first sequence includes one or more learning objects and at least one of the plurality of learning objects remains untested;

computing a second score for the second sequence based upon computed measures of at least one among user relevancy and query relevancy of each learning object in the second sequence, wherein the first sequence and the second sequence are different in at least included learning objects ; and providing the second sequence to a user if the second score of the second sequence exceeds the first score of the first sequence, and otherwise presenting the first sequence to the user.

10. A computer-readable storage medium having embedded therein computer-readable code for causing a computer to perform the operations of:

selecting a learning object that meets at least one of a plurality of predetermined learning objectives from a plurality of learning objects to yield a selected learning object;

comparing an object score for the selected learning object to threshold criteria for user relevancy and query relevancy to determine whether each of one or more predetermined learning prerequisites corresponding to the learning object is satisfied, the object score based upon computed measures of user relevancy and query relevancy for the selected learning object;

if each predetermined learning prerequisite is satisfied, adding the selected learning object to a first finite sequence of learning objects;

repeating said selecting and adding until each of the plurality of predetermined learning objectives are satisfied by the first sequence;

computing a first score for the first sequence based upon computer measures of at least one among user relevancy and query relevancy of each learning object in the first sequence;

generating a second finite sequence of learning objects by removing at least one learning object from the first sequence and adding at least one untested learning object from the plurality of learning objects when the first sequence includes one or more learning objects and at least one of the plurality of learning objects remains untested;

computing a second score for the second sequence based upon computed measures of at least one among user relevancy and query relevancy of each learning object in the second sequence, wherein the first sequence and the second sequence are different in at least one of included learning objects ; and providing the second sequence to a user if the second score of the second sequence exceeds the first score of the first sequence, and otherwise presenting the first sequence to the user.

* * * * *